United States Patent [19]

Heuner et al.

[11] 3,716,723

[45] Feb. 13, 1973

[54] DATA TRANSLATING CIRCUIT

[75] Inventors: Robert Charles Heuner, Bound Brook; Stanley Joseph Niemiec, Somerville, both of N.J.

[73] Assignee: RCA Corporation

[22] Filed: July 6, 1971

[21] Appl. No.: 159,779

[52] U.S. Cl. .................307/221 C, 307/251, 307/255

[51] Int. Cl. ..............................................G11c 19/00

[58] Field of Search..307/205, 221 C, 251, 279, 304, 307/255, 270

[56] References Cited

UNITED STATES PATENTS

| | | | |
|---|---|---|---|
| 2,910,597 | 10/1959 | Strong | 307/255 |
| 3,588,528 | 6/1971 | Terman | 307/221 C |
| 3,431,433 | 3/1969 | Ball et al. | 307/251 |
| 3,573,498 | 4/1971 | Ahrons | 307/251 |
| 3,588,527 | 6/1971 | Cricchi | 307/221 C |
| 3,577,166 | 5/1971 | Yung | 307/251 |
| 3,031,585 | 4/1962 | Frady | 307/317 |
| 3,130,326 | 4/1964 | Habisohn | 307/317 |

OTHER PUBLICATIONS

R. J. Froess "Current Reversal in Inductive Loads" IBM Tech. Disc. Bull. Vol. 11, No. 10, March 1969, page 1365.

Whittaker "A Simple Current Generator" pages 183–184, Nuclear Instruments & Methods 1966.

*Primary Examiner*—Herman Karl Saalbach

*Assistant Examiner*—Ro E. Hart

*Attorney*—H. Christoffersen

[57] ABSTRACT

Two current carrying paths, each connected between a different clock pulse terminal and a common capacitive output node, each path including a field-effect transistor in series with a diode. The diodes are poled to permit the node to be charged when one transistor is turned on and discharged when the other transistor is turned on. The clock pulses, during one time interval, cause current to flow through the one of the paths with the turned on transistor, and during the following time interval prevent current flow in either path.

8 Claims, 5 Drawing Figures

INVENTORS
Robert C. Heuner &
Stanley J. Niemiec
BY H. Christoffersen
ATTORNEY

INVENTORS
Robert C. Heuner &
Stanley J. Niemiec
BY H. Christoffersen
ATTORNEY

DATA TRANSLATING CIRCUIT

BACKGROUND OF THE INVENTION

Many prior art circuits use complementary inverters and transmission gates in the design of dynamic shift registers.

FIG. 1 shows one stage of a conventional, complementary metal-oxide semiconductor (CMOS) dynamic shift register. It includes two complementary inverters ($I_1$ and $I_2$) and two complementary transmission gates ($TG_1$, $TG_2$). Each inverter and each gate includes two transistors of different conductivity type. The first transmission gate ($TG_1$) is coupled between the data input point and the input terminal of the first inverter ($I_1$) and the second transmission gate ($TG_2$) is coupled between the output terminal of $I_1$ and the input terminal of the second inverter ($I_2$). The transmission gates are alternately enabled by clock signals $0_1$ and $0_2$.

When $TG_1$ is turned on, capacitor $C_1$ which may be a discrete or distributed element is charged to the potential level (H*i* or L*o*) of the data input signal and the output of $I_1$ is the inverse of the input signal. When $TG_1$ is on, $TG_2$ is turned off. This prevents the voltage across capacitor $C_2$ which may be a discrete or distributed element from being affected by the data input signal.

When $TG_1$ is turned off, capacitor $C_1$ is disconnected from the data input terminal and its voltage level remains relatively constant. When $TG_2$ is turned on, the output of $I_1$ is fed through $TG_2$ and charges $C_2$. By alternately enabling the transmission gates, data bits are made to flow along the register.

The prior art circuit has capacitive nodes at the input and output of each inverter. Thus 4 nodes in each stage are charged and discharged during each cycle. Additionally, for example, in the prior art circuit, capacitor $C_1$ is charged (or discharged) through $TG_1$ and inverter $I_1$ then responds to the signal across $C_1$. The delay between the application of a signal to the data input terminal and the production of a signal at the output of inverter $I_1$ is cummulative being the sum of the delay due to $C_1$ and that due to $I_1$. Also, though relatively simple, the prior art shift register requires eight transistors per stage. With the development of large scale integrated circuits, it becomes more important that circuits be made simpler, having higher operating speeds, requiring less power, and include, where possible, fewer components.

SUMMARY OF THE INVENTION

First and second current carrying paths, each path comprising the conduction channel of a transistor in series with an asymmetrically conducting means, are connected at one end to a capacitive output node. One path is poled in a direction to charge said node for one condition of input and the other path is poled in a direction to discharge said node for another condition of input signal. Clock signals are applied to the other ends of said paths for supplying power to said paths during one clock interval and for blocking the flow of current through said paths during a second successive clock interval.

BRIEF DESCRIPTION OF THE DRAWINGS

In the accompanying drawings, like reference characters denote like components.

DETAILED DESCRIPTION OF THE INVENTION

Figure 2:
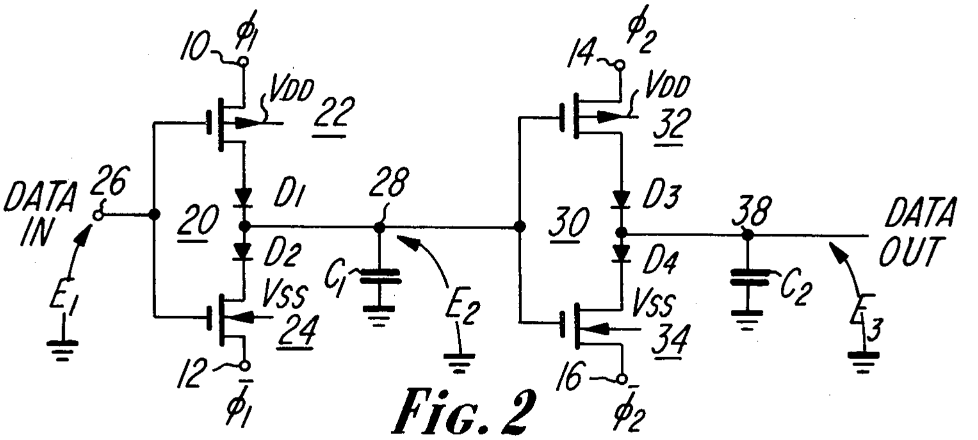
FIG. 2 is a schematic drawing of a signal translating stage embodying the invention.

FIG. 2 shows a signal translating stage comprising clocked inverters 20 and 30. Inverter 20 includes a P-type insulated-gate field-effect transistor (IGFET) 22 connected at its source electrode to terminal 10, at its drain electrode to the anode of diode $D_1$, and at its gate electrode to the gate electrode of N-type IGFET 24 and to data input terminal 26. Transistor 24 is connected at its source electrode to terminal 12 and at its drain electrode to the cathode of diode $D_2$. The anode of diode $D_2$ and the cathode of diode $D_1$ are connected to node 28. Capacitor $C_1$, shown connected to node 28, serves to store the charge applied to it during given clock intervals and represents the total nodal capacitance, whether discrete or distributed, present at node 28.

The gates of transistors 32 and 34 are connected to node 28. P-type transistor 32 is connected at its source electrode to terminal 14 and at its drain electrode to the anode of diode $D_3$. N-type transistor 34 is connected at its source electrode to terminal 16 and at its drain electrode to the cathode of diode $D_4$. The cathode of diode $D_3$ and the anode of diode $D_4$ are connected to output terminal 38. Capacitor $C_2$ which represents the total nodal capacitance is connected between terminal 38 and ground.

A clock signal $\phi_1$ is applied to terminal 10 and $\overline{\phi}_1$ (the complement of $\phi_1$) is applied to terminal 12. A clock signal $\phi_2$ and its complement, $\overline{\phi}_2$, are applied to terminals 14 and 16, respectively.

Figure 5:
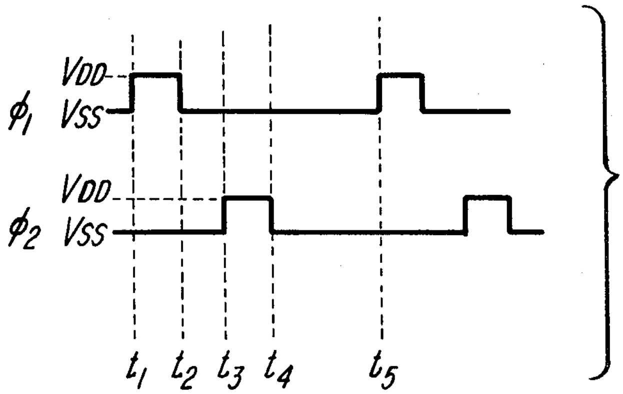
FIG. 5 is a waveform diagram showing the relationship of the clock pulses $0_1$ and $0_2$.

The clock signals $\phi_1$, $\overline{\phi}_1$, $\phi_2$, and $\overline{\phi}_2$ may vary between $+V_{DD}$ volts which may, for example, be equal to +10 volts and which for ease of description will be called "Hi" and $V_{SS}$ which is, for example, set equal to zero volts and which for ease of description will be called "Lo." For proper operation of the circuit of FIG. 2 as a shift register stage, $\phi_1$ and $\phi_2$, shown in FIG. 5, may not both be Hi($+V_{DD}$) at the same time.

The operation of the clocked inverters to transfer data from the stage input 26 to the stage output 38 is explained below. Since inverters 20 and 30 are the same except for being operated by different clock signals, the operation of only one inverter (20) is discussed in detail.

Assume first a time interval ($t_1 - t_2$) during which clocked inverter 30 is not powered (i.e., $\phi_2$ is "Lo" and $\overline{\phi}_2$ is "Hi") and during which clocked inverter 20 is powered (i.e., $\phi_1$ is Hi and $\overline{\phi}_1$ is Lo). With $\phi_1$ – Hi and $\overline{\phi}_1$ – Lo, inverter 20 is operated like a conventional complementary inverter.

For a Data Input signal (denoted by $E_1$) applied to terminal 26 which is H*i*, transistor 22 is cut-off (the conduction channel or path between its source and drain electrodes is an extremely high impedance) while transistor 24 is fully turned on (the conduction path between its source and drain electrodes is a relatively low impedance). The signal at node 28 (denoted by $E_2$) is clamped to terminal 12 by means of the forward conduction of diode $D_2$ and the low "on" impedance of transistor 24. Since $\overline{\phi}_1$ which is applied to terminal 12 is L*o*, output node 28 is clamped to a L*o* value of potential. Actually, the minimum potential at node 28 is, due to the forward diode drop ($V_{BE}$) of diode $D_2$, $V_{BE}$ volts above $V_{SS}$. Thus $E_2$—L*o* is actually $V_{BE}$ volts ($V_{SS}$ is zero volts).

For a signal applied to terminal 26 which is L*o*, N-type transistor 24 is cut-off and P-type transistor 22 is turned on. Transistor 22 in series with the forward conduction of diode $D_1$ provides a conduction path between terminal 10 and output node 28 which charges capacitor $C_1$ to a H*i* value of potential. Due to the forward diode drop ($V_{BE}$) of diode $D_1$ the maximum potential across $C_1$ will be equal to $V_{DD}$ minus the $V_{BE}$ of diode $D_1$. Thus, $E_2$—H*i* is actually ($V_{DD}$–$V_{BE}$) volts.

To summarize, when $\phi_1$ is Hi and $\overline{\phi}_1$ is Lo the data input $E_1$ at terminal 26 is inverted and transferred plus or minus one diode drop to node 28 by means of inverter 20. The output, $E_2$, at node 28 will be either at $+V_{BE}$ volts or at ($+V_{DD}$–$V_{BE}$) volts and will be stored across the capacitance represented by $C_1$, at the input circuit of inverter 30, until the next time $\phi_1$ goes Hi.

While the presence of diodes $D_1$ and $D_2$ does cause the voltage at node 28 to be reduced to the extent of the voltage drop across one diode, this presents no problem in the operation of the circuit. The voltage available at 28 ($V_{DD}$–$V_{BE}$ or $V_{SS}$+$V_{BE}$) is still much more than needed to turn on the appropriate transistor of the following stage.

Assume now a time interval ($t_3$ –$t_4$) during which clocked inverter 30 is powered ($\phi_2$ is Hi and $\overline{\phi}_2$ is Lo) and during which clocked inverter 20 is not powered ($\phi_1$ is Lo and $\overline{\phi}_1$ is H*i*). With $\phi_2$ Hi and $\overline{\phi}_2$ Lo inverter 30 is operated like a standard complementary inverter and transfers, while it inverts, the data ($E_2$) present at node 28 to produce an output ($E_3$) at output terminal 38. The data output $E_3$ will have a high level of ($V_{DD}$– $V_{BE}$) volts and a low level of $V_{BE}$ volts which will be in phase with the data input, $E_1$, but delayed therefrom by the time it takes $\phi_2$ to go H*i* after $\phi_1$ goes Hi ($t_1$ to $t_3$).

The novel data translating stage embodying the invention thus performs the same function provided by conventional dynamic shift register stage but employs only 4 transistors and 4 diodes rather than 8 transistors. It should be evident that many stages of the type shown in FIG. 2 may be connected in cascade to form a shift register of any desired length.

It will now be shown that when the inverters are not powered (i.e., $\phi_1$ is Lo and $\overline{\phi}_1$ is Hi for inverter 20 or $\phi_2$ is Lo and $\overline{\phi}_2$ is Hi for inverter 30) that, regardless of the value of the input or output signal, the diodes in combination with the transistors prevent the discharge of the information stored across the output or storage capacitors ($C_1$ or $C_2$). Since inverters 20 and 30 are identical, the storage operation of only one inverter, namely inverter 20, will be described in detail.

A. Assume $E_1$ is Hi and $E_2$ is Hi ($\phi_1$ – Lo, $\overline{\phi}_1$ – Hi)

$E_1$—H*i* is of sufficient amplitude to cut off transistor 22 and to prevent the flow of current therethrough even when power is supplied to the inverter. Even if transistor 22 could conduct, diode $D_1$ would be reverse biased since its anode would be at $0_1$—L*o* (zero volts) while its cathode is at ($V_{DD}$–$V_{BE}$) volts. With $E_1$—*Hi*, transistor 24 is turned-on and that electrode of transistor 24 which is connected to terminal 12 now acts as the drain and that electrode of transistor 24 connected to the cathode of diode $D_2$ acts as the source. Since $\overline{\phi}_1$ is Hi and $E_1$ is Hi 24 conducts until $+V_{DD}$ volts are applied to the cathode of diode $D_2$. As this voltage ($+V_{DD}$) is more positive than the voltage $E_2 = V_{DD}$–$V_{BE}$ at the anode of diode $D_2$, this diode is reverse biased. Therefore, for the condition when $\phi_1$ is Lo and $\overline{\phi}_1$ is Hi, the data stored across capacitor $C_1$ remains unaltered when $E_1$ and $E_2$ are both Hi. Except for the slight effect of leakage current through this reverse biased diode, the potential across $C_1$ is maintained at the level it acquired during the $\phi_1$ = Hi interval.

B. Assume $E_1$ is Hi and $E_2$ is Lo ($\phi_1$–Lo, $\overline{\phi}_1$–Hi)

With $E_1$—H*i* and $E_2$—L*o* transistor 22 is cut off while transistor 24 is turned on. Even if transistor 22 could conduct, diode $D_1$ would still be reverse biased since its anode would be connected to L*o* (zero volts) while its cathode is connected to junction point 28 whose minimum potential is at least at $V_{BE}$ volts. Transistor 24 which is turned on applies $+V_{DD}$ volts to the cathode of diode $D_2$ whose anode is at $V_{BE}$ volts. Diode $D_2$ is therefore reverse biased and prevents the conduction of any current (except for leakage) which would alter the potential level across capacitor $C_1$. Therefore, diodes $D_1$ and $D_2$ in combination with the transistors isolate the capacitive node.

C. Assume $E_1$ is Lo and $E_2$ is Hi ($\phi_1$–Lo, $\overline{\phi}_1$–Hi)

With $E_1$—L*o* transistor 24 is cut off and except for leakage no current can flow through it. Transistor 22 is turned on by $E_1$—LO and $\phi_1$—Lo is applied to the anode of diode $D_1$. However, since $E_2$—Hi equal to ($V_{DD}$–$V_{BE}$) volts is applied to the cathode of diode $D_1$, the diode is reverse biased and blocks the flow of current through transistor 22.

D. Assume $E_1$ is Lo and $E_2$ is Lo ($\phi_1$ – Lo, $\overline{\phi}_1$ – Hi)

With $E_1$—L*o* transistor 24 is cut-off and no current can flow through it. Transistor 22, however, is turned on and the $\phi_1$—Lo signal is applied to the anode of diode $D_1$. Since the potential applied to the cathode of diode $D_1$ is at least $V_{BE}$ volts, diode $D_1$ is reverse biased and blocks the flow of current. The potential across capacitor $C_1$ thus remains unaltered.

It has thus been shown that output node 28 is decoupled from the clock terminals 10 and 12 when $\phi_1$ is Lo and $\overline{\phi}_1$ is Hi regardless of the value of $E_1$ or $E_2$. Diodes $D_1$ and $D_2$ are thus used, essentially, to perform the function performed in the prior art by the complementary transmission gate. The diodes are two terminal devices as compared to transistors which are three terminal devices. The use of diodes may thus enable a simpler and smaller layout.

In the circuit of FIG. 2, in contrast to the prior art circuit, there are two nodes (28, 38) which are charged and discharged each cycle. Thus the power dissipated in circuits embodying the invention may be less than in the prior art circuit. Also, in the circuit of FIG. 2 the delay due to the transmission gates of the prior art circuit has been eliminated. In the circuit of FIG. 2 signals are applied directly to the gates of the inverter. Thus only the response time of the inverters limit the maximum speed of operation. Additionally, the circuit of FIG. 2 is less susceptible to noise transients due to the pulsing of the clocks since the nodes 28 and 38 are separated from the clock terminals by the series combination of a transistor and a diode.

Figure 3:
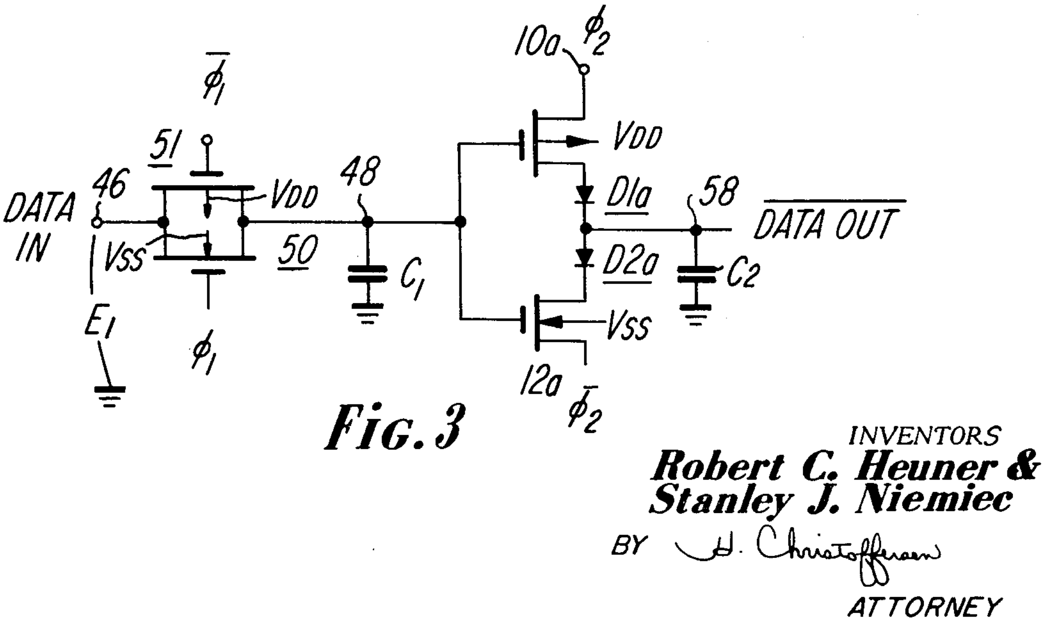
FIG. 3 is a schematic drawing of another signal translating stage embodying the invention.

FIG. 3 illustrates a shift register stage in which the data, as in the circuit of FIG. 2, is shifted into the stage at $\phi_1$—Hi time and shifted out at $\phi_2$—Hi time. But, in contrast to the FIG. 2 circuit, the output signal produced by each shift register stage (4 transistors and 2 diodes) is the complement of the input signal to that stage.

The data signal ($E_1$) is applied to input terminal 46. The input signal is translated to node 48 by means of transmission gate 50 comprising complementary field-effect transistor 51 and 53 having their conduction paths connected in parallel between nodes 46 and 48. $\overline{\phi}_1$ is applied to the gate of P-type transistor 51 and $\phi_1$ is applied to the gate of N-type transistor 53. The data signal is transferred from node 48 to output terminal 58 by means of clocked inverter 20a which is identical to inverters 20 and 30 described in FIG. 2. Inverter **20*a* is powered by clock signals $\phi_2$ and $\overline{\phi}_2$. The time relationship between $\phi_1$ and $\phi_2$ may be varied considerably, as discussed for the FIG. 2** circuit, but as before, $\phi_1$ and $\phi_2$ may not both be positive at the same time for properly operating the circuit as a shift register stage.

In the operation of the circuit of FIG. 3 when $\phi_1$ is Hi, ($\phi_2$ is Lo, $\overline{\phi}_2$ is Hi) transmission gate 50 conducts and the data signal, $E_1$, present at terminal 46 is transferred without change in sign to node 48 to which is connected capacitor $C_1$. Capacitor $C_1$ is thereby charged at $\phi_1$—Hi time to the lever of the data input.

During the time interval that transmission gate 50 is enabled, inverter **20*a* is cut-off and output terminal 58 is decoupled from node 48. When $\phi_1$ goes low ($\overline{\phi}_1$ goes Hi) transmission gate 50 cuts-off and capacitor $C_1$ remains charged to the value of the data input signal present during $\phi_1$—Hi. Subsequently, when $\phi_2$ goes Hi ($\phi_2$—Lo) clocked inverter 20*a* operates, as described above, like a conventional complementary inverter. The data present at node 28 then gets transferred and inverted to data output terminal 58**.

Figure 1:
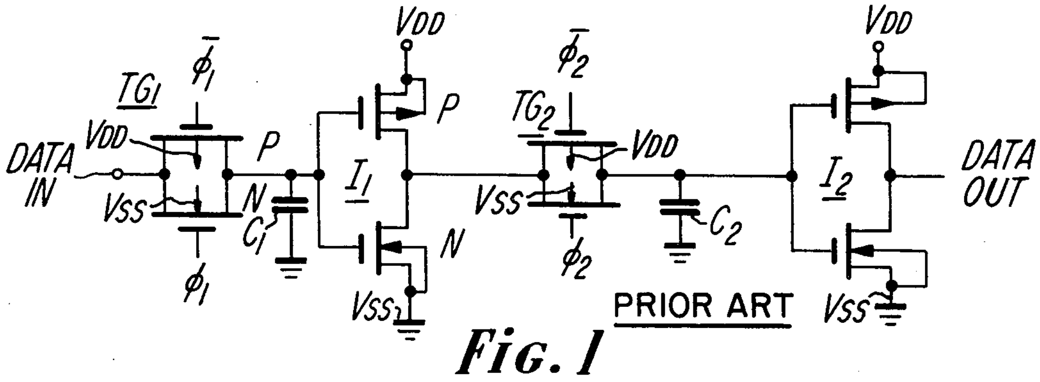
FIG. 1 is a schematic drawing of a prior art circuit depicting one stage of a complementary metal-oxide semiconductor (C–MOS) dynamic shift register stage.

The importance of this embodiment is that only six devices are necessary to form a translating stage as compared to the eight devices required in conventional circuits. This is a saving of two devices per stage. For example, in shift registers having 100 or more stages this novel circuit provides a considerable (200 diodes for 100 stage register) saving in the number of components. For a register having an odd number of stages, the output signals are complents of the input signals; for a register having an even number of stages, the output signals are of the same binary value as the input signals. Also, the circuit of FIG. 3 consumes considerably less power than the prior art circuit of FIG. 1. Two nodes per stage (48, 58) are discharged each cycle which compares favorably with the prior art. Also, whenever a complementary inverter is switched there is a time interval when both devices are turned on. This contributes considerably to the power dissipation. In the circuit of FIG. 3 there is only one inverter per stage which is a distinct advantage.

In terms of speed, the circuit of FIG. 3 is faster than the prior art circuit since the total stage delay is comprises of the contribution of one inverter and one transmission gate as compared to the two inverters and the two transmission gates of the prior art circuit.

Figure 4:
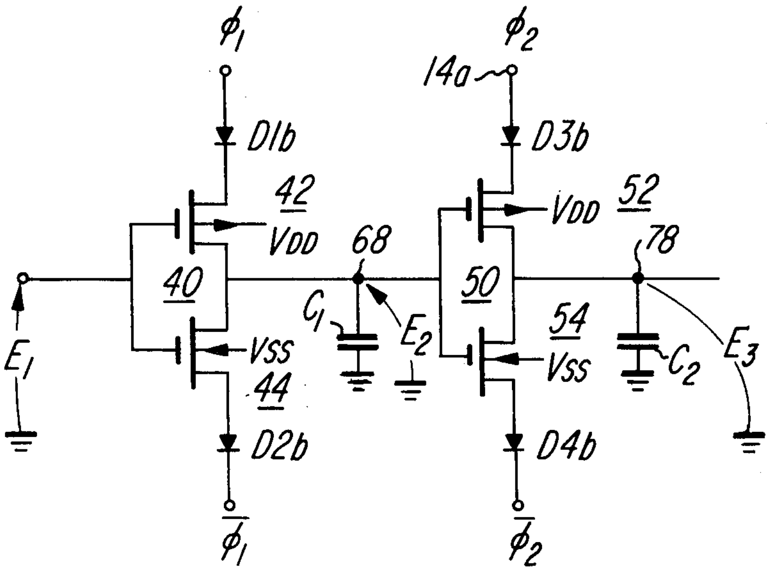
FIG. 4 is a schematic drawing of still another signal translating stage embodying the invention.

Although in both circuits discussed above the diodes have been shown connected to the drains of the transistors, it should be evident that, as shown in FIG. 4, they may instead be connected between the source electrodes of the transistors and the clock terminals.

It will be recalled that in the circuits of FIGS. 2 and 3 the output level of the clocked inverters is either $(V_{DD}-V_{BE})$ volts or $V_{BE}$ volts. As discussed above, this may present a problem due to the slight forward bias imposed on the cut-off transistor of the inverter. In the circuit of FIG. 4, the $V_{BE}$ offset is still present at the output nodes (68, 78), but now the gate-to-source potential ($V_{GS}$) of the cut-off transistor is virtually zero. In response to a $\phi_1$—Hi ($\overline{\phi}_1$—Lo) signal the output $E_2$, produced across $C_1$ in response to a data input signal ($E_1$), is actually either $(V_{DD}-V_{BE})$ volts or $(V_{BE})$ volts. When $\phi_2$ goes Hi ($\overline{\phi}_2$—Lo) the potential at terminals **14*a* and 16*a* is $+V_{DD}$ and zero volts, respectively. Due to the voltage drop across the diodes, the potential at the source electrode of transistor 52 is $(V_{DD}-V_{BE})$ volts and the potential at the source electrode of transistor 54 is at $V_{BE}$ volts above ground. Therefore, for $E_2$ equal to $(V_{DD}-VB_{BE})$ volts the $V_{GS}$ of transistor 52 is zero and transistor 52** is unquestionably turned off. Similarly for $E_2$—*Lo* equal to $V_{BE}$ volts, the $V_{GS}$ of transistor 54 is zero and transistor 52 is unquestionably turned off.

The undesired effect of the offset potential due to the diode drops is thus eliminated in the circuit of FIG. 4. Therefore, in the circuit of FIG. 4 devices having relatively low threshold voltages may be used safely.

In the embodiments of FIGS. 2, 3, and 4 diodes have been shown to achieve unidirectional conduction in either one of the two paths of each inverter. It should be evident, however, that any other asymmetrically conducting device, one which presents a relatively high impedance in one direction and a relatively low impedance in the other direction of conduction, could be used instead.

What is claimed is:

1. A data translating stage comprising:

two active elements, each having a conduction path and a control electrode for controlling the conductance of said path;

two asymmetrically conducting elements;

first and second current carrying paths, each path connected between a capacitive output node and a different one of first and second clock terminals, each of said paths including the conduction path of one of said elements in series with one of said asymmetrically conducting elements, one of said asymmetrically conducting elements poled for charging said node and the other poled for discharging said node;

means for concurrently applying an input signal to the control electrodes of said two active elements for placing one of their conduction paths in a relatively low impedance condition and the other one in a relatively high impedance condition and means for applying clock signals to said first and second terminals of a sense, during a first time interval, to permit conduction through the one of said first and second paths having an active element which exhibits a relatively low impedance and of a sense, during a following time interval, to prevent the flow of current in either one of said paths.

2. The combination as claimed in claim 1 wherein each one of said active elements comprises a field-effect transistor; each transistor having source and drain electrodes defining the ends of a conduction channel through which current can flow bidirectionally and each transistor having a gate electrode; wherein said gate electrode is said control electrode and said conduction channel is said conduction path; and wherein each one of said asymmetrically conducting element comprises a diode poled to allow conduction in only one direction through the transistor to which it is connected.

3. The combination as claimed in claim 2 wherein the anode of the diode of said first path is connected in common with the cathode of the diode of said second path to said output node;

wherein the conduction channel of the transistors of said first path is connected between the cathode of the diode of said first path and said first clock terminal;

wherein the conduction channel of the transistor of said second path is connected between the anode of the diode of said second path and said second clock terminal; and wherein the clock signal applied at said second terminal is the complement of the clock signal applied at said first terminal.

4. The combination as claimed in claim 2, wherein the gate electrodes of the transistors of said first and second paths are connected in common;

wherein the drain electrodes of the transistors of the two paths are connected in common to said output node;

wherein the source electrode of the transistor of said first path is connected to the cathode of the diode of said first path whose anode is connected to said first clock terminal;

wherein the source electrode of the transistor of said second path is connected to the anode of the diode of said second path whose cathode is connected to said second terminal; and wherein the clock signal applied to said first terminal is the complement of the signal applied at said second terminal.

5. The combination as claimed in claim 2 further including a data input terminal and two field-effect transistors of different conductivity type having their conduction channels connected in parallel for forming a transmission gate;

means connecting one end of the conduction channels of said transmission gate transistors to said data input terminal, and means connecting the other end of their conduction channels to the gate electrodes of the transistors of said first and second paths; and means for applying a second clock signal to the gate electrodes of said two transmission gate transistors for enabling said transmission gate during a time interval other than said first time interval.

6. The combination as claimed in claim 3 wherein the transistor in said first path is of one conductivity type and wherein the transistor in said second path is of opposite conductivity type.

7. The combination comprising:

first and second field effect transistors having a conduction path through which current can flow bidirectionally and a control electrode;

a first path comprising the conduction path of said first transistor connected in series with a first diode between a first terminal and a capacitive output node; said first diode being poled to allow conduction in only one direction through said first transistor;

a second path comprising the conduction path of said second transistor connected in series with a second diode between a second terminal and said output node; said second diode being poled to allow conduction in only one direction through said second transistor;

data input means connected to the control electrode of said two transistors for turning-on one of said first and second transistors for one signal condition and for turning-on the other one of said first and second transistors for a complementary signal condition;

means adapted to receive clock signals having one value during a first time interval and a second value during a second time interval; and means adapted to receive the complement of said clock signals; and means for applying said clock signals to said first terminal and the complement of said clock signals to said second terminal; said diodes being poled for during said first time interval allowing power to be supplied from said clock signals and said complementary clock signals to said first and second paths for producing a current responsive to said data input means in one of said two paths and producing a corresponding charge at said output node and for during a second time interval said diodes being poled to prevent the flow of current through said paths for preventing the charge at said output node from changing during said second time interval.

8. A shift register comprising:

N stages, each stage including first and second current carrying paths, each path connected between a capacitive output node and a different one of first and second clock terminals, each of said paths including a transistor in series with a unidirectional conducting element, said first path poled for charging said node and said second path poled for discharging said node;

means for applying a first clock signal and its complement to said first and second terminals, respectively, of every other stage of said N stages for, during a first time interval, supplying power to said first and second paths and for, during a second successive time interval, preventing the flow of current through said paths;

means for applying a second clock signal and its complement to said first and second terminals, respectively, of the remaining ones of said N stages for during said second time interval supplying power to the paths of said remaining stages and for during said first time interval preventing the flow of current through said paths;

means connecting the control electrodes of the transistors of all the stages, but the first, to the output node of the preceding stage, for during the time interval the stage is powered turning-on one of said two paths for producing an output responsive to the signal present at said node; and means for applying data input signals to the control electrodes of the transistors of said first stage.

* * * * *

UNITED STATES PATENT OFFICE
CERTIFICATE OF CORRECTION

Patent No. 3,716,723 Dated February 13, 1973

Inventor(s) Robert Charles Heuner and Stanley Joseph Niemiec

It is certified that error appears in the above-identified patent and that said Letters Patent are hereby corrected as shown below:

Col. 1, line 18: "$O_1$ and $O_2$" should be -- $\emptyset_1$ and $\emptyset_2$ --

Col. 2, line 11: "$O_1$ and $O_2$" should be -- $\emptyset_1$ and $\emptyset_2$ --

Col. 4, line 8, before "24" insert -- transistor --

Col. 4, line 36: "LO" should be -- Lo --

Col. 6, line 1: "prises" should be -- prised --

Col. 6, line 17: before "signal" insert --clock--

Col. 6, line 27: "$VB_{BE}$" should be --$V_{BE}$ --

Signed and sealed this 22nd day of January 1974.

(SEAL)
Attest:

EDWARD M.FLETCHER,JR.
Attesting Officer

RENE D. TEGTMEYER
Acting Commissioner of Patents